United States Patent
Yoshimoto (10) Patent No.: US 8,203,915 B2
(45) Date of Patent: Jun. 19, 2012

(54) OPTICAL DISC READER

(75) Inventor: Tadafumi Yoshimoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 138 days.

(21) Appl. No.: 12/705,122

(22) Filed: Feb. 12, 2010

(65) Prior Publication Data

US 2010/0202265 A1    Aug. 12, 2010

(30) Foreign Application Priority Data

Feb. 12, 2009    (JP) ................. 2009-030300

(51) Int. Cl.
*G11B 7/085* (2006.01)
*G11B 7/00* (2006.01)

(52) U.S. Cl. ............... 369/30.12; 369/53.35; 369/44.26

(58) Field of Classification Search ............... 369/30.12, 369/30.14, 53.13, 53.2, 44.27, 44.29, 44.26, 369/44.13, 44.31, 44.32, 112.01, 112.03, 369/44.23, 44.41, 44.42, 53.35, 53.36
See application file for complete search history.

(56) References Cited

U.S. PATENT DOCUMENTS

| 6,768,705 B2* | 7/2004 | Hirai .................. 369/44.28 |
| 7,706,216 B2* | 4/2010 | Arai .................. 369/44.26 |
| 2007/0206468 A1 | 9/2007 | Takahashi et al. |

FOREIGN PATENT DOCUMENTS

| JP | 9-330554 A | 12/1997 |
| JP | 2005-38542 A | 2/2005 |
| JP | 2006-31885 A | 2/2006 |

* cited by examiner

*Primary Examiner* — Ali Neyzari
(74) *Attorney, Agent, or Firm* — Crowell & Moring LLP (57) ABSTRACT

An optical disc reader comprising a controller that controls a read operation to read data recorded on an optical disc and a counter that counts the number of zero crossings in a tracking error signal. Between the completion of focusing operation and the start of tracking operation, the controller determines whether or not the light beam is properly focused on a data recording layer in the optical disc based on the number of zero crossings in the tracking error signal counted by the counter. If it is determined that the light beam is not properly focused, the controller causes the focusing operation to be performed again. Otherwise, if it is determined that the light beam is properly focused on the data recording layer, the controller causes the tracking operation to be performed and then starts the read operation.

4 Claims, 6 Drawing Sheets

OPTICAL DISC READER

BACKGROUND OF THE INVENTION

1. Field of the Invention

The present invention relates to an optical disc reader that reads data recorded on optical discs such as CDs, DVDs, and Blu-ray discs (BDs).

2. Description of the Related Art

Figure 6:
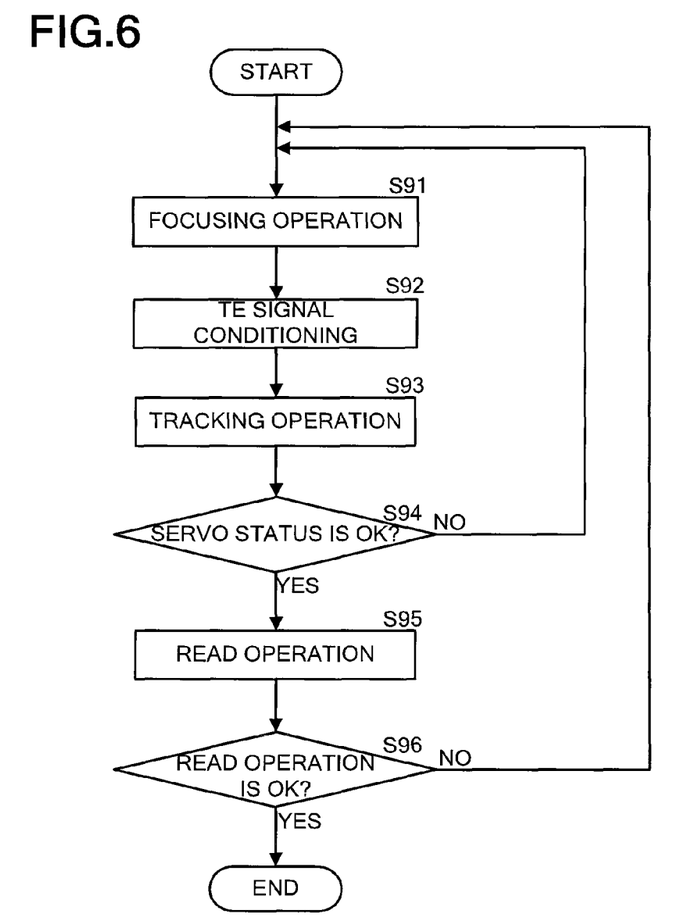
FIG. 6 is a flowchart showing the operation of the conventional optical disc reader.

Optical disc readers read data recorded on an optical disc by focusing a light beam onto the optical disc and receiving the light reflected from the optical disc while rotating the optical disc. For reading data recorded on an optical disc, such an optical disc reader operates as shown in FIG. 6.

First, the optical disc reader performs a focusing operation for causing the focal point of the light beam to be on a data recording layer in the optical disc (S91). Subsequently, the optical disc reader performs tracking error (TE) signal conditioning to amplify a TE signal (S92), and then performs a tracking operation for causing the focal point of the light beam to be on a data recording track on the optical disc (S93).

Then, the optical disc reader determines whether or not the servo status is OK (S94). More particularly, it determines whether or not the focusing operation has been performed properly and focusing servo (for keeping the focal point of the light beam on the data recording layer in the optical disc) is in normal operation, and whether or not the tracking operation has been performed properly and tracking servo (for keeping the focal point of the light beam on the data recording track on the optical disc) is in normal operation.

If the servo status is OK (i.e., if the focusing servo and tracking servo are in normal operation) (YES at S94), the optical disc reader starts the read operation to read data recorded on the optical disc (S95).

On the other hand, if the servo status is not OK (i.e., if the focusing servo is not in normal operation or if the tracking servo is not in normal operation) (NO at S94), the optical disc reader performs a recovery operation by repeating the process from the above step S91. Further, after the start of the read operation, if the read operation is not OK (i.e., if data recorded on the optical disc cannot be read out normally) (NO at S96), the optical disc reader also performs the recovery operation by repeating the process from the above step S91.

Japanese Laid-open Patent Publication No. 2005-38542 discloses an optical disc reader designed to reduce the time of focus search by first performing a preliminary focus search to detect search driving voltages at the times of peak and bottom in a focus error signal and then performing an actual focus search within the range between the search driving voltages detected at the times of peak and bottom. Japanese Laid-open Patent Publication No. HEI 9-330554 discloses an optical disc reader designed to determine the type of an optical disc based on a tracking error signal. Further, Japanese Laid-open Patent Publication No. 2006-31885 discloses an optical disc reader designed to determine the type of an optical disc based on a focus drive value at the time when the focal point reaches a recording surface during a focus search or based on a focus drive value in an in-focus condition.

Typically, optical discs comprise a transparent substrate layer, data recording layers formed on the substrate layer, and a protective layer formed on the data recording layers. From the substrate layer side of an optical disc, an optical disc reader focuses a light beam onto the optical disc. Therefore, in the focusing operation, the light beam may not be properly focused (on a data recording layer in the optical disc) but may be focused on the surface of the optical disc (surface of the substrate layer) or other improper position.

In the above described conventional optical disc reader, when the focusing operation at the step S91 has not been performed properly, the tracking operation at the step S93 is not performed properly so that the tracking servo operation is not performed normally. Even if the tracking servo operation is performed normally, data recorded on the optical disc cannot be read out properly in the read operation at the step S95. Thus, when the focusing operation at the step S91 has not been performed properly, the result at the step S94 or the step S96 would be NO, which causes the optical disc reader to perform the recovery operation.

In other words, when the focusing operation has not been performed properly, the conventional optical disc reader still performs the tracking operation although the light beam is not properly focused on the data recording layer, and thereafter performs the recovery operation. This will increase the time taken for the recovery operation to be performed after the focusing operation has been performed improperly. This problem cannot be solved even with the techniques disclosed in the above mentioned patent documents.

SUMMARY OF THE INVENTION

An object of the present invention is to provide an optical disc reader that can promptly perform a recovery operation when a focusing operation has not been performed properly.

According to an aspect of the present invention, this object is achieved by an optical disc reader comprising: light emission means for emitting a light beam; light collection means for collecting the light beam emitted from the light emission means and focusing the light beam onto an optical disc; focusing means for performing a focusing operation to cause the light collection means to focus the light beam on a data recording layer in the optical disc; tracking error signal generating means for generating a tracking error signal corresponding to a radial offset of a focal point of the light collection means from a data recording track on the optical disc; tracking means for performing a tracking operation to cause the light collection means to focus the light beam on the data recording track on the optical disc, based on the tracking error signal generated by the tracking error signal generating means; and a controller that controls a read operation to read data recorded on the optical disc.

After causing the focusing means to perform the focusing operation, the controller executes a determination process for determining whether or not the light beam is properly focused on the data recording layer based on the tracking error signal generated by the tracking error signal generating means, before causing the tracking means to perform the tracking operation.

When, as a result of the determination process, the controller determines that the light beam is not properly focused, the controller causes the focusing means to perform the focusing operation again.

When, as a result of the determination process, the controller determines that the light beam is properly focused on the data recording layer, the controller causes the tracking means to perform the tracking operation and then starts the read operation.

According to the above optical disc reader, between the completion of the focusing operation and the start of the tracking operation, the determination as to whether or not the light beam is focused properly on the data recording layer is made based on the tracking error signal. Then, if the light beam is not properly focused, the focusing operation is performed again for recovery before the tracking operation is performed. Therefore, the optical disc reader can promptly perform the recovery operation in the case where the focusing operation has not been performed properly, thus reducing the time taken for the recovery operation to be performed after the focusing operation has been performed improperly. Further, the determination as to whether or not the light beam is properly focused on the data recording layer is made based on the tracking error signal. Thereby, with the simple configuration, the optical disc reader can make the determination, as to whether or not the light beam is properly focused on the data recording layer, before the tracking operation is performed. Moreover, when the light beam is not properly focused, the focusing operation is performed again for recovery before the tracking operation is performed. This can prevent the tracking operation or the read operation being performed where the light beam is not focused on the data recording layer, thus preventing the light collection means from colliding with the optical disc due to focusing servo disturbance when the light beam is not properly focused.

Preferably, the optical disc reader further comprises zero crossing counting means for counting number of zero crossings in the tracking error signal generated by the tracking error signal generating means, wherein, in the determination process, the controller determines whether or not the light beam is properly focused on the data recording layer based on the number of zero crossings in the tracking error signal that is counted by the zero crossing counting means.

In one embodiment, the optical disc reader further comprises tracking error signal conditioning means for performing tracking error signal conditioning to amplify the tracking error signal generated by the tracking error signal generating means, wherein the tracking means performs the tracking operation based on the tracking error signal conditioned by the tracking error signal conditioning means; wherein the zero crossing counting means counts the number of zero crossings in the tracking error signal conditioned by the tracking error signal conditioning means; and wherein, in the determination process, when the number of zero crossings in the tracking error signal, which is counted by the zero crossing counting means during one revolution of the optical disc, is less than or equal to a threshold value, the controller determines that the light beam is properly focused on the data recording layer, and when the number of zero crossings in the tracking error signal, which is counted by the zero crossing counting means during one revolution of the optical disc, exceeds the threshold value, the controller determines that the light beam is not properly focused.

In another embodiment, the optical disc reader further comprises tracking error signal conditioning means for performing tracking error signal conditioning to amplify the tracking error signal generated by the tracking error signal generating means, wherein the tracking means performs the tracking operation based on the tracking error signal conditioned by the tracking error signal conditioning means; wherein the zero crossing counting means counts the number of zero crossings in the tracking error signal before the tracking error signal conditioning by the tracking error signal conditioning means; and wherein, in the determination process, when the number of zero crossings in the tracking error signal, which is counted by the zero crossing counting means during one revolution of the optical disc, is greater than or equal to a threshold value, the controller determines that the light beam is properly focused on the data recording layer, and when the number of zero crossings in the tracking error signal, which is counted by the zero crossing counting means during one revolution of the optical disc, is less than the threshold value, the controller determines that the light beam is not properly focused.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Referring now to the accompanying drawings, optical disc readers embodying the present invention are described. It is to be noted that the following description of preferred embodiments of the present invention has been presented for purposes of illustration and description, and is not intended to be exhaustive or to limit the present invention to the precise form disclosed.

First Embodiment

Figure 1:
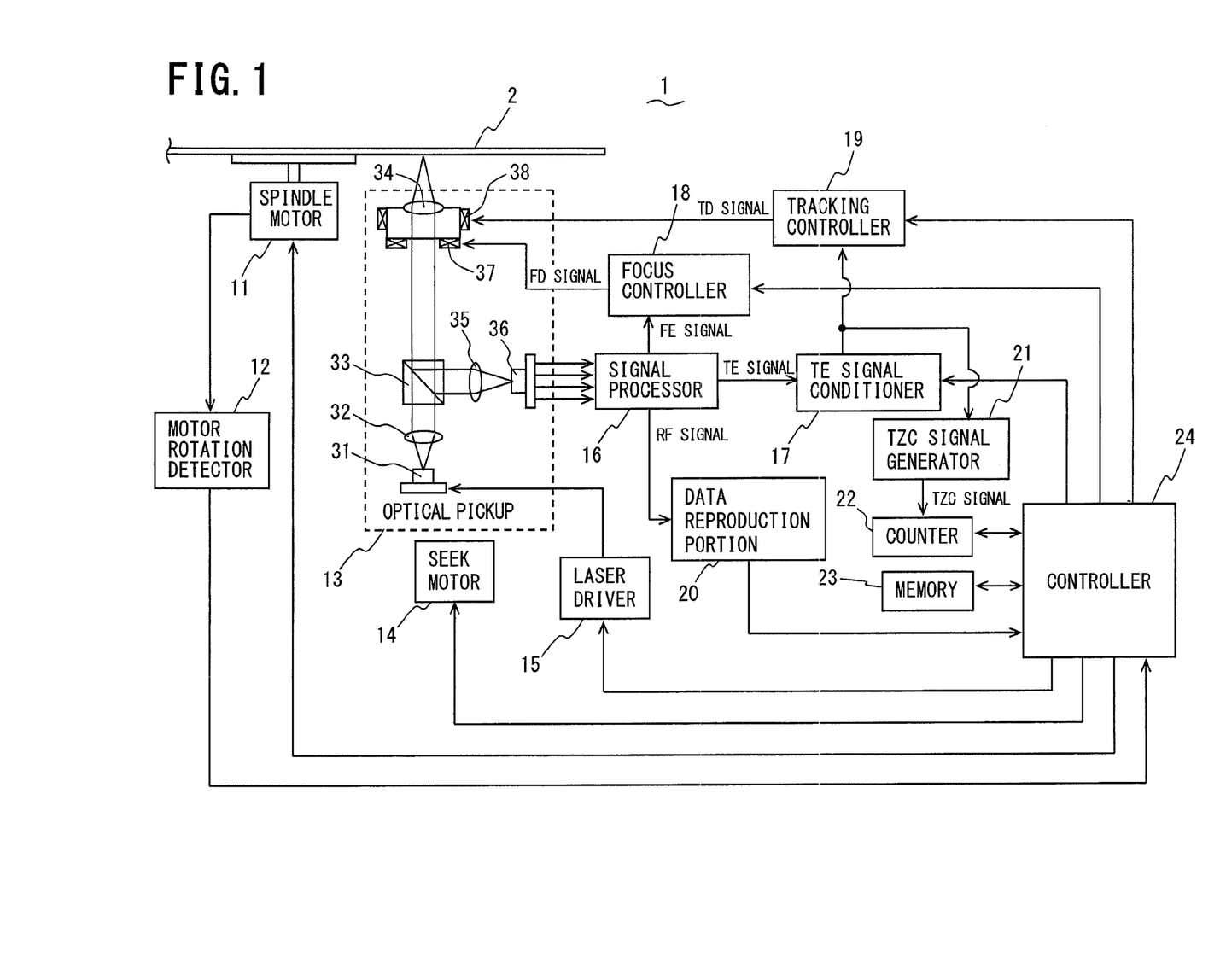
FIG. 1 is an electrical block diagram showing an optical disc reader according to a first embodiment of the present invention.

A first embodiment is now described. FIG. 1 shows the configuration of an optical disc reader according to the first embodiment. The optical disc reader 1 is an apparatus that is used to read data recorded on an optical disc 2 such as a CD, a DVD, a Blu-ray disc (BD), or the like.

The optical disc 2 comprises a transparent substrate layer, a data recording layer formed on the substrate layer, and a protective layer formed on the data recording layer. The data recording layer has data recording tracks formed concentrically or spirally with a given pitch. The optical disc 2 has pits, which cause light reflection different from the surrounding areas, on the data recording tracks. By the arrangement of pits, data are recorded on the optical disc 2.

The optical disc reader 1 reads data recorded (represented by the lengths and arrangement of pits) on the optical disc 2 by focusing a light beam onto the optical disc 2 from the substrate layer side of the optical disc 2 and receiving the light reflected from the optical disc 2 while rotating the optical disc 2.

The optical disc reader 1 comprises a spindle motor 11, a motor rotation detector 12, an optical pickup 13, a seek motor 14, a laser driver 15, a signal processor 16, a TE signal conditioner 17, a focus controller 18, a tracking controller 19, and a data reproduction portion 20. The optical disc reader 1 further comprises a TZC signal generator 21, a counter 22, a memory 23, a controller 24 including a CPU for controlling the operation of the optical disc reader 1, a ROM, and a RAM, and so on. Stored in the ROM of the controller 24 are various kinds of data and programs for controlling the operation of the optical disc reader 1.

The spindle motor 11 is used to rotate the optical disc 2 mounted thereon. The optical disc 2 is mounted on the spindle motor 11 with the substrate layer facing the optical pickup 13. Under the control of the controller 24, the spindle motor 11 is driven to rotate the optical disc 2 mounted thereon. The motor rotation detector 12 detects the rotation of the spindle motor 11 and outputs a rotation angle signal indicating the rotation angle of the spindle motor 11 (thus indicating the rotation angle of the optical disc 2 mounted on the spindle motor 11).

The optical pickup 13 focuses a light beam onto the optical disc 2 and receives the light reflected from the optical disc 2, and has a semiconductor laser 31, a collimator lens 32, a beam splitter 33, an objective lens 34, a light receiving lens 35, a photodiode 36, a focus actuator 37, a tracking actuator 38, and so on. The objective lens 34 is supported on a lens support mechanism (not shown) so that it can change the position in the direction perpendicular to the data recording layer of the optical disc 2 and in a radial direction of the optical disc 2.

The semiconductor laser 31 is driven by the laser driver 15 to emit a laser beam. The laser beam emitted from the semiconductor laser 31 is collimated by the collimator lens 32, passes through the beam splitter 33, and then is collected by the objective lens 34 to be focused onto the optical disc 2 from the substrate layer side of the optical disc 2. The light focused on the optical disc 2 is reflected by the optical disc 2. The light reflected by the optical disc 2 is collimated by the objective lens 34, reflected by the beam splitter 33, and then collected by the light receiving lens 35 to be focused onto the photodiode 36. The semiconductor laser 31 corresponds to light emission means in claim. The objective lens 34 corresponds to light collection means in claim.

The photodiode 36 receives the light reflected from the optical disc 2 via the objective lens 34, the beam splitter 33, and the light receiving lens 35. The photodiode 36 has a plurality of light receiving regions, each of which outputs a light reception signal with a voltage level depending on the intensity of the received light.

Under the control of the focus controller 18, the focus actuator 37 is driven to change the position of the objective lens 34 in the direction perpendicular to the data recording layer of the optical disc 2. This change in the position of the objective lens 34 causes the focal point of the light beam, which is emitted from the semiconductor laser 31 and collected and focused by the objective lens 34, to move in the direction perpendicular to the data recording layer of the optical disc 2.

Under the control of the tracking controller 19, the tracking actuator 38 is driven to change the position of the objective lens 34 in a radial direction of the optical disc 2. This change in the position of the objective lens 34 causes the focal point of the light beam, which is emitted from the semiconductor laser 31 and collected and focused by the objective lens 34, to move in the radial direction of the optical disc 2.

Under the control of the controller 24, the seek motor 14 moves the optical pickup 13 in a radial direction of the optical disc 2 (for a seek operation). The laser driver 15 drives the semiconductor laser 31 for light emission, under the control of the controller 24.

The signal processor 16 generates an RF signal, a focus error (FE) signal, and a tracking error (TE) signal from the light reception signals output from the photodiode 36. RF signals are signals that change depending on the presence or absence of a pit on a data recording track on the optical disc 2. FE signals are signals corresponding to the vertical offset of the focal point of the objective lens 34 from the data recording layer in the optical disc 2. TE signals are signals corresponding to the radial offset of the focal point of the objective lens 34 from a data recording track on the optical disc 2. The signal processor 16 corresponds to tracking error signal generating means in claim.

Under the control of the controller 24, the TE signal conditioner 17 performs tracking error (TE) signal conditioning to amplify the TE signal generated by the signal processor 16. More particularly, when the TE signal conditioner 17 is not receiving the instruction to perform the TE signal conditioning from the controller 24, it directly outputs the TE signal generated by the signal processor 16 without conditioning (amplifying) the TE signal. On the other hand, when the TE signal conditioner 17 is receiving the instruction to perform the TE signal conditioning from the controller 24, it conditions (amplifies) the TE signal generated by the signal processor 16 to output the conditioned TE signal.

The focus controller 18 generates a focus drive (FD) signal for driving the focus actuator 37 and outputs the generated FD signal. Using the FD signal, the focus controller 18 drives the focus actuator 37 to control the position of the objective lens 34 in the direction perpendicular to the data recording layer of the optical disc 2. More particularly, by generating and outputting the FD signal, the focus controller 18 controls the position of the focal point of the objective lens 34 in the direction perpendicular to the data recording layer of the optical disc 2.

Further, under the control of the controller 24, the focus controller 18 performs a focusing operation for causing the objective lens 34 to focus the light beam on the data recording layer in the optical disc 2, based on the FE signal generated by the signal processor 16. More particularly, in response to an instruction for the focusing operation from the controller 24, the focus controller 18 starts the focusing operation. In the focusing operation, the focus controller 18 generates and outputs the FD signal so that the objective lens 34 focuses the light beam onto the data recording layer in the optical disc 2, based on the FE signal generated by the signal processor 16. The focus controller 18 corresponds to focusing means in claim.

Subsequent to the focusing operation, the focus controller 18 performs a focusing servo operation for keeping the focal point of the objective lens 34 on the data recording layer in the optical disc 2. More particularly, after the focusing operation is completed, the focus controller 18 starts the focusing servo operation. In the focusing servo operation, the focus controller 18 generates and outputs the FD signal based on the FE signal generated by the signal processor 16 so that the focal point of the objective lens 34 can be continuously on the data recording layer in the optical disc 2.

The tracking controller 19 generates and outputs a tracking drive (TD) signal for driving the tracking actuator 38. Using the TD signal, the tracking controller 19 drives the tracking actuator 38 to control the position of the objective lens 34 in a radial direction of the optical disc 2. More particularly, by generating and outputting the TD signal, the tracking controller 19 controls the position of the focal point of the objective lens 34 in the radial direction of the optical disc 2.

Further, under the control of the controller 24, the tracking controller 19 performs a tracking operation for causing the objective lens 34 to focus the light beam on a data recording track on the optical disc 2, based on the TE signal output from the TE signal conditioner 17 (i.e., based on the TE signal generated by the signal processor 16). More particularly, in response to an instruction for the tracking operation from the controller 24, the tracking controller 19 starts the tracking operation. In the tracking operation, the tracking controller 19 generates and outputs the TD signal so that the objective lens 34 focuses the light beam on a data recording track on the optical disc 2, based on the TE signal output from the TE signal conditioner 17. The tracking controller 19 corresponds to tracking means in claim.

Subsequent to the tracking operation, the tracking controller 19 performs a tracking servo operation for keeping the focal point of the objective lens 34 on the data recording track on the optical disc 2. More particularly, after the tracking operation is completed, the tracking controller 19 starts the tracking servo operation. In the tracking servo operation, the tracking controller 19 generates and outputs the TD signal based on the TE signal output from the TE signal conditioner 17 so that the focal point of the objective lens 34 can be continuously on the data recording track on the optical disc 2.

The data reproduction portion 20 detects the lengths and arrangement of pits formed on data recording tracks of the optical disc 2 based on the RF signal generated by the signal processor 16. Then, based on the detected lengths and arrangement of pits, the data reproduction portion 20 reproduces data recorded on the optical disc 2 (recorded data represented by the lengths and arrangement of pits) and outputs recorded data signals representing the recorded data.

The TZC signal generator 21 generates and outputs a TZC signal based on the TE signal output from the TE signal conditioner 17. The TZC signal is a signal representing zero crossings in the TE signal. More particularly, the TZC signal generator 21 detects zero crossing points in the TE signal output from the TE signal conditioner 17, and outputs, as the TZC signal, a signal that rises when the TE signal changes from negative to positive (crosses zero) and falls when the TE signal changes from positive to negative (crosses zero).

Under the control of the controller 24, the counter 22 counts rising edges and falling edges in the TZC signal output from the TZC signal generator 21, and outputs the count value. More particularly, in response to a count instruction from the controller 24, the counter 22 starts to count the rising edges and falling edges in the TZC signal output from the TZC signal generator 21, and outputs the count value.

By the counter 22 counting the rising edges and falling edges in the TZC signal output from the TZC signal generator 21, the number of zero crossings in the TE signal output from the TE signal conditioner 17 (thus, the number of zero crossings in the TE signal generated by the signal processor 16) is counted and output as the count value of the counter 22. The TZC signal generator 21 and the counter 22 corresponds to zero crossing counting means in claim.

The memory 23 stores various kinds of data for determining whether or not the focusing operation has been performed properly so that the light beam is focused on the data recording layer, as well as various kinds of data for controlling the operation of the optical disc reader 1. The controller 24 controls each component of the optical disc reader 1 for various operations such as the TE signal conditioning by the TE signal conditioner 17, the focusing operation by the focus controller 18, the tracking operation by the tracking controller 19, the counting operation by the counter 22, the read operation for reading data recorded on the optical disc 2, and so on.

Figure 2:
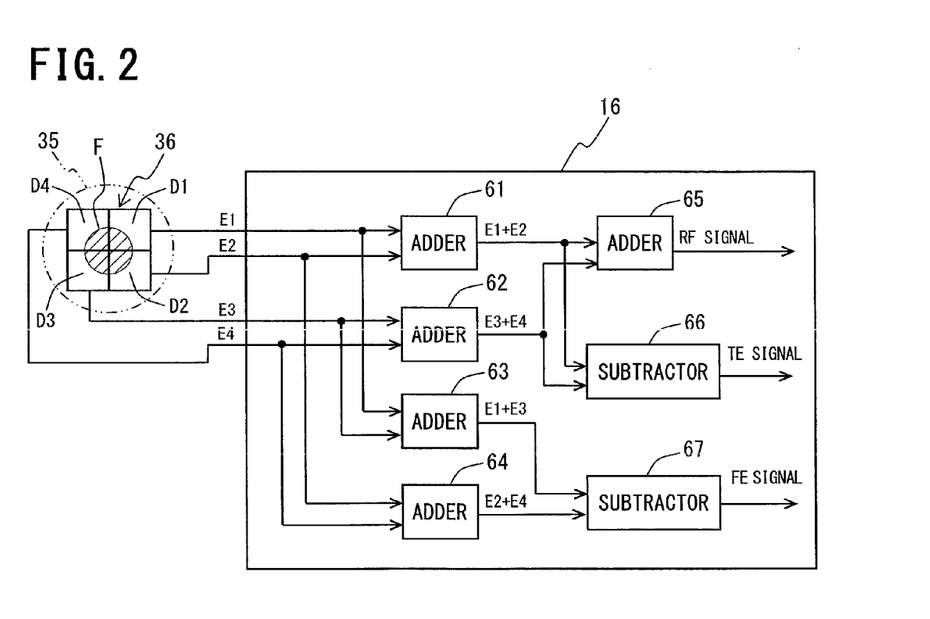
FIG. 2 shows the configuration of a photodiode along with a signal processor in the optical disc reader.

FIG. 2 shows the configuration of the photodiode 36 in the above described optical pickup 13 along with the signal processor 16. The photodiode 36 has four light receiving regions D1, D2, D3, and D4, and outputs a light reception signal E1 with a voltage level depending on the intensity of the light received in the light receiving region D1, a light reception signal E2 with a voltage level depending on the intensity of the light received in the light receiving region D2, a light reception signal E3 with a voltage level depending on the intensity of the light received in the light receiving region D3, and a light reception signal E4 with a voltage level depending on the intensity of the light received in the light receiving region D4. The light reflected by the optical disc 2 is astigmatically focused by the light receiving lens 35 onto the photodiode 36 over the four light receiving regions D1, D2, D3, and D4 (the region denoted by F in FIG. 2 shows the light focused on the photodiode 36).

The signal processor 16 has an adder 61 that adds the light reception signals E1 and E2 output from the photodiode 36, an adder 62 that adds the light reception signals E3 and E4 output from the photodiode 36, an adder 63 that adds the light reception signals E1 and E3 output from the photodiode 36, and an adder 64 that adds the light reception signals E2 and E4 output from the photodiode 36. Further, the signal processor 16 has an adder 65 that adds the output signal from the adder 61 and the output signal from the adder 62, a subtractor 66 that computes the difference between the output signal from the adder 61 and the output signal from the adder 62, and a subtractor 67 that computes the difference between the output signal from the adder 63 and the output signal from the adder 64.

The signal processor 16 generates the RF signal by the adders 61, 62, and 65. More particularly, the signal processor 16 generates the RF signal (E1+E2+E3+E4). The signal processor 16 generates the FE signal by the adders 63 and 64, and the subtractor 67. More particularly, the signal processor 16 generates the FE signal ((E1+E3)−(E2+E4)) by so-called astigmatic method. Further, the signal processor 16 generates the TE signal by the adders 61 and 62, and the subtractor 66. More particularly, the signal processor 16 generates the TE signal ((E1+E2)−(E3+E4)) by so-called push-pull method.

The read operation for reading data recorded on the optical disc 2 is performed in the following manner, under the control of the controller 24. The controller 24 causes the seek motor 14 to move the optical pickup 13 so that the light beam from the optical pickup 13 (light beam emitted from the semiconductor laser 31 and collected by the objective lens 34) is focused onto a desired position on the optical disc 2, which is being rotated by the spindle motor 11, and obtains recorded data signals output from the data reproduction portion 20 at the time. Subsequently, the controller 24 analyzes the recorded data signals to obtain data recorded on the optical disc 2. Thereby, the data recorded on the optical disc 2 is read out. The read operation is performed in this manner.

For performing this read operation, the controller 24 causes the focus controller 18 to perform the focusing operation and subsequently causes the tracking controller 19 to perform the tracking operation, and thereafter starts the read operation.

In the above process, after causing the focus controller 18 to perform the focusing operation, the controller 24 determines whether or not the light beam is properly focused on the data recording layer based on the TE signal generated by the signal processor 16 before causing the tracking controller 19 to perform the tracking operation. As a result, if it is determined that the light beam is properly focused on the data recording layer, the controller 24 causes the tracking controller 19 to perform the tracking operation. Otherwise, if it is determined that the light beam is not properly focused, i.e., that the light beam is not focused on the data recording layer, the controller 24 causes the focus controller 18 to perform the focusing operation again.

Figure 3A:
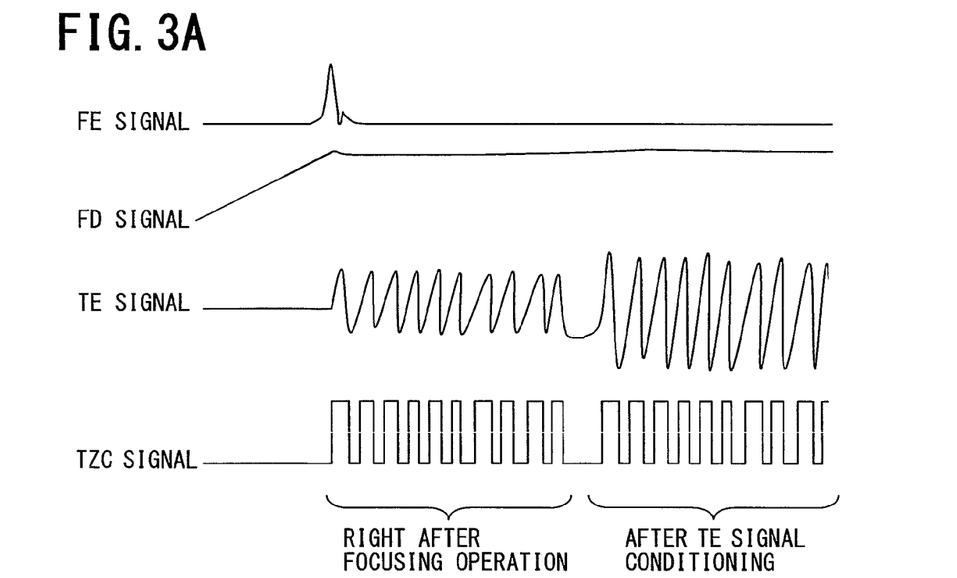
FIG. 3A illustrates the waveforms of a TE signal and a TZC signal in the case where the optical disc reader has performed a focusing operation properly.
Figure 3B:
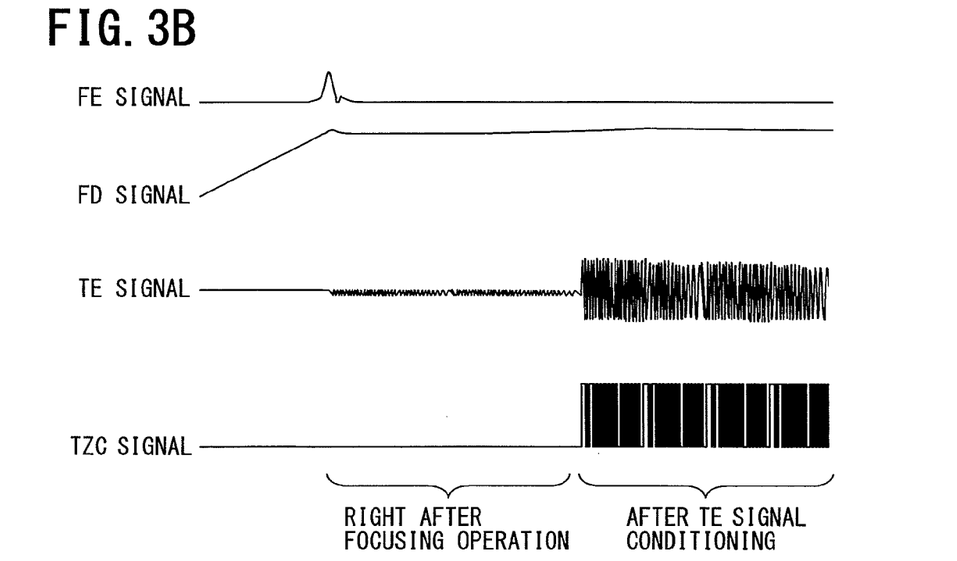
FIG. 3B illustrates the waveforms of the TE signal and the TZC signal in the case where the focusing operation has not been performed properly.

FIG. 3A shows the waveforms of the TE signal and the TZC signal where the focusing operation has been performed properly (i.e., where the focal point of the objective lens 34 is on the data recording layer in the optical disc 2). FIG. 3B shows the waveforms of the TE signal and the TZC signal where the focusing operation has not been performed properly (i.e., where the focal point of the objective lens 34 is not on the data recording layer in the optical disc 2 (but, for example, on the surface of the substrate layer in the optical disc 2).

In the focusing operation, the focus controller 18 first increases the level of the FD signal gradually. This causes the objective lens 34 to gradually move toward the optical disc 2 so as to move the focal point of the objective lens 34 toward the optical disc 2. During this operation, after the focal point of the objective lens 34 comes closer than a certain distance to the optical disc 2, the voltage of the FE signal generated by the signal processor 16 first changes to positive and increases gradually, and then decreases gradually and changes to negative.

When the voltage of the FE signal changes from positive to negative, the focus controller 18 determines that the focal point of the objective lens 34 is just on the data recording layer in the optical disc 2, and then sets the FD signal at the level when the voltage of the FE signal changes from positive to negative. More particularly, by generating the FD signal at the level when the voltage of the FE signal changes from positive to negative, the focus controller 18 causes the objective lens 34 to focus the light beam on the data recording layer in the optical disc 2.

When the focusing operation has been performed properly (i.e., when the focal point of the objective lens 34 is on the data recording layer in the optical disc 2), the TE signal output from the signal processor 16 and the TZC signal output from the TZC signal generator 21 are as shown in FIG. 3A. More particularly, right after the focusing operation is completed (or before the TE signal conditioning is performed), the TE signal has a waveform with a sufficient amplitude (amplitude large enough for the zero crossing points to be detected by the TZC signal generator 21) and an appropriate frequency (frequency corresponding to the presence or absence of pits) by being influenced by the change in reflection due to the presence or absence of pits in the data recording layer of the optical disc 2. Accordingly, the TZC signal has a waveform with rising edges and falling edges at the appropriate frequency. After the TE signal conditioning (to amplify the TE signal) is performed, the TE signal also has a waveform with a sufficient amplitude and an appropriate frequency, so that the TZC signal has a waveform with rising edges and falling edges at the appropriate frequency.

On the other hand, if the focusing operation has not been performed properly (i.e., when the focal point of the objective lens 34 is not on the data recording layer in the optical disc 2), the TE signal output from the signal processor 16 and the TZC signal output from the TZC signal generator 21 are as shown in FIG. 3B. More particularly, right after the focusing operation is completed (or just before the TE signal conditioning is performed), the TE signal is little influenced by the change in reflection due to the presence or absence of pits formed on the data recording layer of the optical disc 2. Instead, the TE signal is affected by a high frequency noise to have a waveform with a small amplitude (amplitude too small for the zero crossing points to be detected by the TZC signal generator 21) and a frequency higher than the appropriate frequency (frequency of the high frequency noise). Accordingly, the TZC signal has a waveform with no rising or falling edge. After the TE signal conditioning is performed to amplify the TE signal, the TE signal has a waveform with a sufficient amplitude. Thereby, the TZC signal has a waveform with rising edges and falling edges at a frequency higher than the appropriate frequency.

Therefore, the controller 24 makes the above described determination, as to whether or not the light beam is properly focused on the data recording layer, based on the number of rising and falling edges in the TZC signal output from the TZC signal generator 21 (i.e., the number of zero crossings in the TE signal).

In this embodiment, the controller 24 counts the number of zero crossings in the TE signal after the TE signal conditioning is performed by using the TZC signal generator 21 and the counter 22. Thereby, the controller 24 obtains the number of zero crossings in the TE signal after the TE signal conditioning, which is counted during one revolution of the optical disc 2. If the number of zero crossings is less than or equal to a threshold value, the controller 24 determines that the light beam is properly focused on the data recording layer. Otherwise, if the number of zero crossings exceeds the threshold value, the controller 24 determines that the light beam is not properly focused. The threshold value is stored in the memory 23 in advance as data used for the determination as to whether or not the light beam is properly focused on the data recording layer.

Figure 4:
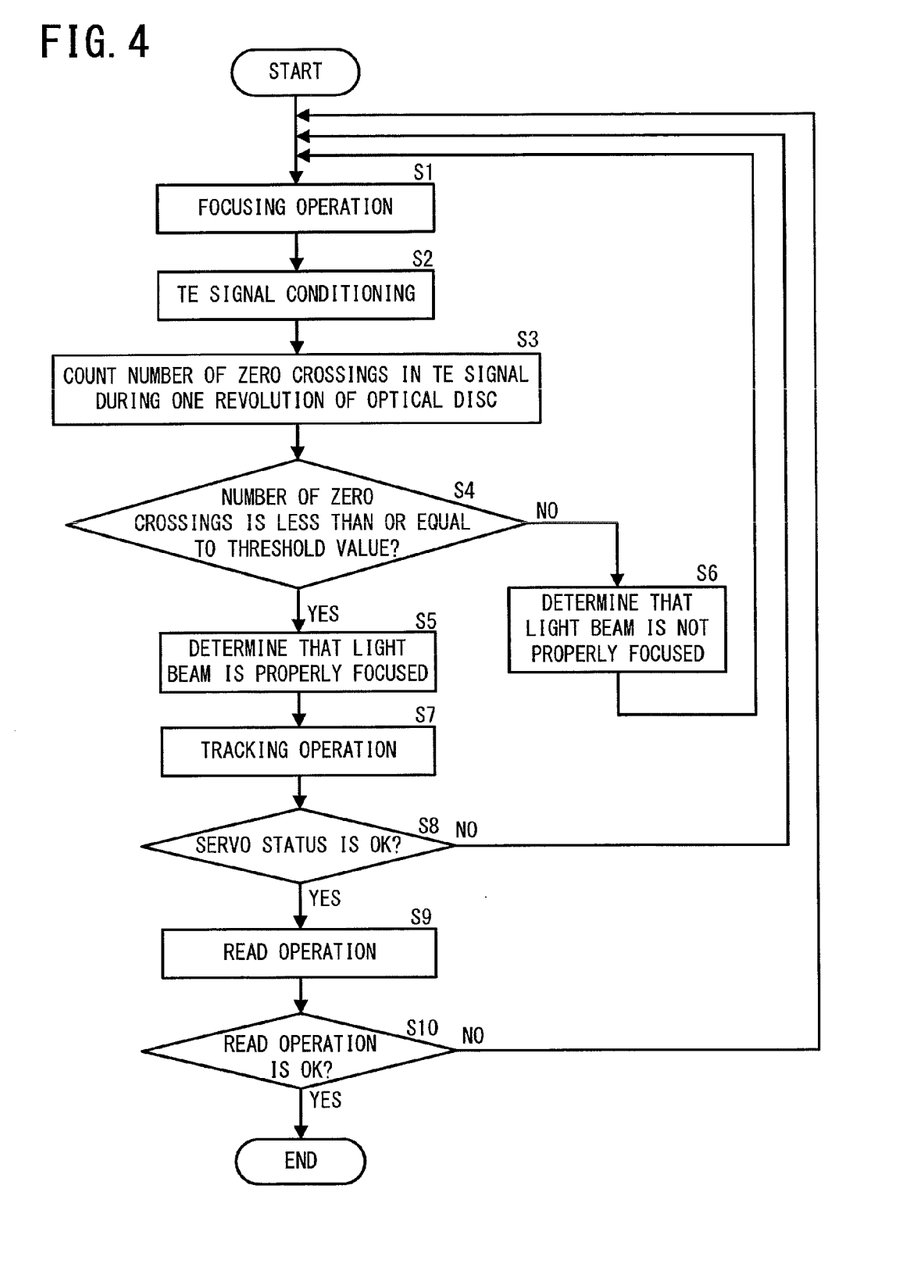
FIG. 4 is a flowchart showing the operation of the optical disc reader.

FIG. 4 is a flowchart showing the operation of the optical disc reader 1. When the controller 24 reads data recorded on the optical disc 2, it first executes the focusing operation (S1). More particularly, the controller 24 directs the focus controller 18 to perform the focusing operation. In response, the focus controller 18 performs the focusing operation so as to cause the objective lens 34 to focus the light beam on the data recording layer in the optical disc 2.

After the focusing operation, the controller 24 executes the TE signal conditioning (S2). More particularly, the controller 24 directs the TE signal conditioner 17 to perform the TE signal conditioning. In response, the TE signal conditioner 17 performs the TE signal conditioning to amplify the TE signal generated by the signal processor 16, and outputs the conditioned (amplified) TE signal.

Subsequently, the controller 24 executes the counting of the number of zero crossings in the TE signal during one revolution of the optical disc 2 (S3). More particularly, the controller 24 directs the counter 22 to count rising and falling edges in the TZC signal output from the TZC signal generator 21. In response, the counter 22 counts the rising and falling edges in the TZC signal output from the TZC signal generator 21. Since the TE signal conditioning has been performed at the above step S2, the TZC signal generator 21 detects zero crossing points in the conditioned TE signal to output the TZC signal. Therefore, the TZC signal generator 21 and the counter 22 counts the number of zero crossings in the conditioned TE signal, so that the number of zero crossings is output as the count value of the counter 22. Based on the rotation angle signal output from the motor rotation detector 12 and the count value output from the counter 22, the controller 24 obtains the number of zero crossings in the conditioned TE signal, which is counted by the TZC signal generator 21 and the counter 22 during one revolution of the optical disc 2, i.e., the number of zero crossings in the conditioned TE signal during one revolution of the optical disc 2.

Subsequently, the controller 24 determines whether or not the number of zero crossings in the conditioned TE signal during one revolution of the optical disc 2 is less than or equal to the threshold value (S4). If the number of zero crossings in the conditioned TE signal during one revolution of the optical disc 2 is less than or equal to the threshold value (YES at S4), the controller 24 determines that the light beam is properly focused on the data recording layer (S5). Otherwise, if the number of zero crossings in the conditioned TE signal during one revolution of the optical disc 2 exceeds the threshold value (NO at S4), the controller 24 determines that the light beam is not properly focused (S6).

When the controller 24 determines that the light beam is not properly focused (S6), the controller 24 repeats the process from the above step S1 to perform the recovery operation.

On the other hand, when the controller 24 determines that the light beam is properly focused on the data recording layer (S5), the controller 24 executes the tracking operation (S7). More particularly, the controller 24 directs the tracking controller 19 to perform the tracking operation. In response, the tracking controller 19 performs the tracking operation based on the TE signal conditioned by the TE signal conditioner 17 so as to cause the objective lens 34 to focus the light beam on a data recording track on the optical disc 2.

After the tracking operation, the controller 24 determines whether or not the servo status is OK (S8). More particularly, the controller 24 determines whether or not the focusing servo operation and the tracking servo operation are being performed normally.

If the servo status is OK (YES at S8), the controller 24 executes the read operation (S9). More particularly, the controller 24 causes the seek motor 14 to move the optical pickup 13 so that the light beam collected by the objective lens 34 is focused onto a desired position on the optical disc 2 being rotated by the spindle motor 11, obtains recorded data signals output from the data reproduction portion 20 at the time, and analyzes the obtained recorded data signals. Thereby, data recorded on the optical disc 2 is read out.

On the other hand, if the servo status is not OK (NO at S8), the controller 24 repeats the process from the above step S1 to perform the recovery operation. Further, after the start of the read operation, if the read operation is not OK (i.e., if data recorded on the optical disc 2 cannot be read out normally) (NO at S10), the controller 24 also repeats the process from the above step S1 to perform the recovery operation.

According to the optical disc reader 1 configured as described above, between the completion of the focusing operation and the start of the tracking operation, the determination as to whether or not the light beam is properly focused on the data recording layer is made based on the number of zero crossings in the TE signal conditioned by the TE signal conditioner 17 (i.e., based on the TE signal generated by the signal processor 16). Then, if it is determined that the light beam is not properly focused, the focusing operation is performed again for recovery before the tracking operation is performed.

Therefore, the optical disc reader 1 configured as described above can promptly perform the recovery operation in the case where the focusing operation has not been performed properly, thus reducing the time taken for the recovery operation to be performed after the focusing operation has been performed improperly.

Further, the determination as to whether or not the light beam is properly focused on the data recording layer is made based on the TE signal generated by the signal processor 16. Thereby, with the simple configuration, the optical disc reader 1 can make the determination, as to whether or not the light beam is properly focused on the data recording layer, before the tracking operation is performed.

Moreover, when the light beam is not focused on the data recording layer, the focusing operation is performed again for recovery before the tracking operation is performed. This can prevent the tracking operation or the read operation being performed where the light beam is not focused on the data recording layer, thus preventing the objective lens 34 from colliding with the optical disc 2 due to focusing servo disturbance when the light beam is not properly focused.

Second Embodiment

A second embodiment is now described. An optical disc reader 1 according to this embodiment is similar in configuration to the above described first embodiment (shown in FIGS. 1 and 2). A TZC signal generator 21 has a low-pass filter, and removes high-frequency components contained in the TE signal via the low-pass filter before outputting the TZC signal.

In the optical disc reader 1 according to this embodiment, a controller 24 counts the number of zero crossings in the TE signal before the TE signal conditioning by using the TZC signal generator 21 and a counter 22. Thereby, the controller 24 obtains the number of zero crossings in the TE signal before the TE signal conditioning, which is counted during one revolution of the optical disc 2. Then, if the number of zero crossings is greater than or equal to a threshold value, the controller 24 determines that the light beam is properly focused on the data recording layer. Otherwise, if the number of zero crossings is less than the threshold value, the controller 24 determines that the light beam is not properly focused.

Figure 5:
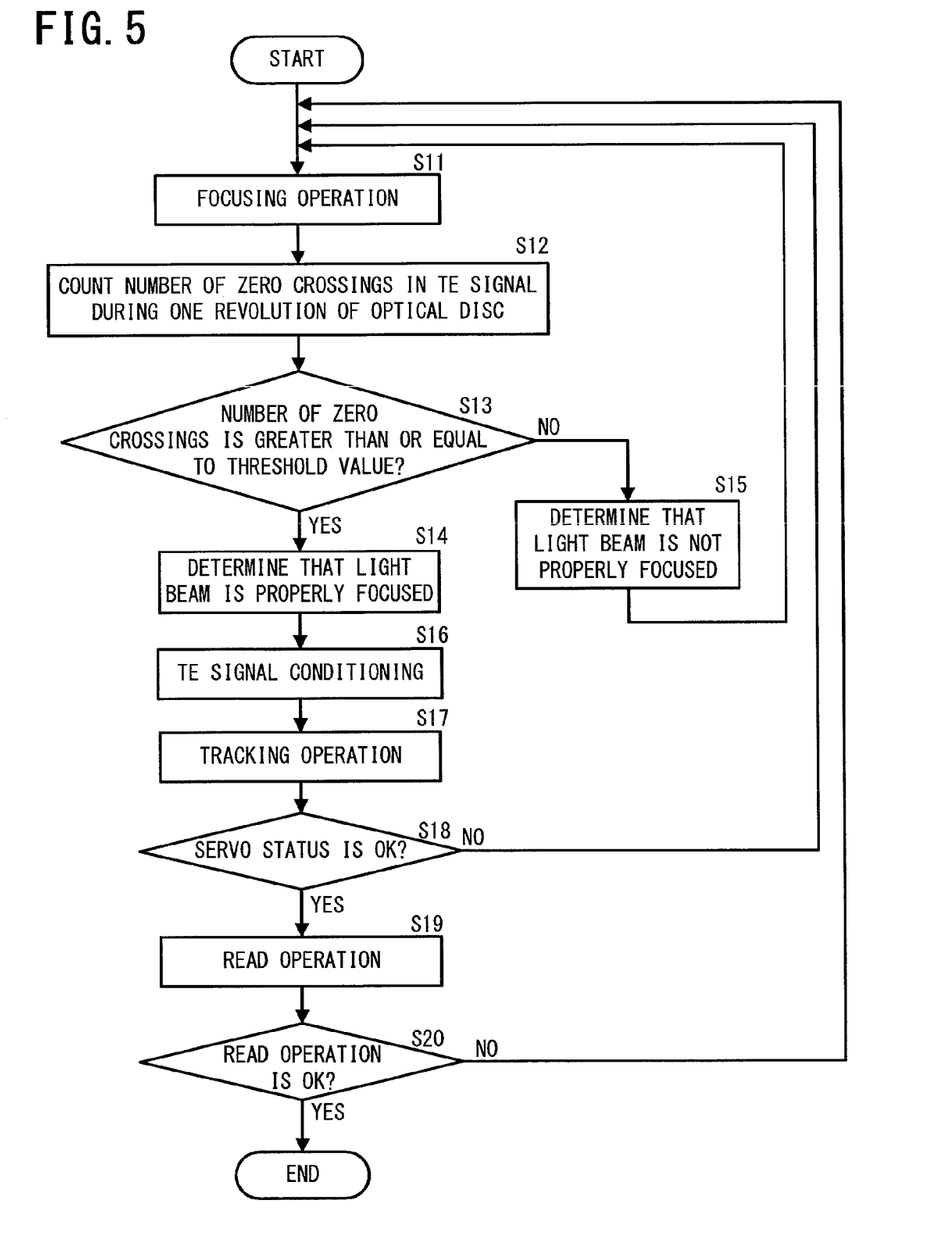
FIG. 5 is a flowchart showing the operation of an optical disc reader according to a second embodiment of the present invention.

FIG. 5 is a flowchart showing the operation of the optical disc reader 1 according to this embodiment. When the controller 24 in the optical disc reader 1 of this embodiment reads data recorded on an optical disc 2, the controller 24 first performs the focusing operation in a manner similar to the above described first embodiment (S11). More particularly, the controller 24 directs a focus controller 18 to perform the focusing operation. In response, the focus controller 18 performs the focusing operation so as to cause the objective lens 34 to focus the light beam on a data recording layer in the optical disc 2.

After the focusing operation, the controller 24 executes counting of the number of zero crossings in the TE signal during one revolution of the optical disc 2 (S12). More particularly, the controller 24 directs the counter 22 to count rising and falling edges in the TZC signal output from the TZC signal generator 21. In response, the counter 22 counts the rising and falling edges in the TZC signal output from the TZC signal generator 21. Since the TE signal conditioning has not been performed yet, the TZC signal generator 21 detects zero crossing points in the TE signal before the TE signal conditioning to output the TZC signal. Thus, the TZC signal generator 21 and the counter 22 counts the number of zero crossings in the TE signal before the TE signal conditioning so that the counted number of zero crossings is output as the count value of the counter 22. Based on the rotation angle signal output from a motor rotation detector 12 and the count value output from the counter 22, the controller 24 obtains the number of zero crossings in the TE signal before the TE signal conditioning, which is counted by the TZC signal generator 21 and the counter 22 during one revolution of the optical disc 2, i.e., the number of zero crossings in the TE signal before the TE signal conditioning during one revolution of the optical disc 2.

Subsequently, the controller 24 determines whether or not the number of zero crossings in the TE signal before the TE signal conditioning during one revolution of the optical disc 2 is greater than or equal to the threshold value (S13). If the number of zero crossings in the TE signal before the TE signal conditioning during one revolution of the optical disc 2 is greater than or equal to the threshold value (YES at S13), the controller 24 determines that the light beam is properly focused on the data recording layer (S14). Otherwise, if the number of zero crossings in the TE signal before the TE signal conditioning during one revolution of the optical disc 2 is less than the threshold value (NO at S13), the controller 24 determines that the light beam is not properly focused (S15).

When the controller 24 determines that the light beam is not properly focused (S15), the controller 24 repeats the process from the above step S11 to perform the recovery operation.

On the other hand, when the controller 24 determines that the light beam is properly focused on the data recording layer (S14), the controller 24 performs the TE signal conditioning (S16). More particularly, the controller 24 directs a TE signal conditioner 17 to perform the TE signal conditioning. In response, the TE signal conditioner 17 performs the TE signal conditioning to amplify the TE signal generated by the signal processor 16, and outputs the conditioned (amplified) TE signal.

Subsequent to the TE signal conditioning, the controller 24 executes the tracking operation (S17). More particularly, the controller 24 directs a tracking controller 19 to perform the tracking operation. In response, the tracking controller 19 performs the tracking operation based on the TE signal conditioned by the TE signal conditioner 17 so as to cause the objective lens 34 to focus the light beam on a data recording track on the optical disc 2.

After the tracking operation, the controller 24 determines whether or not the servo status is OK (S18). More particularly, the controller 24 determines whether or not the focusing servo operation and the tracking servo operation are being performed normally.

If the servo status is OK (YES at S18), the controller 24 executes the read operation (S19). More particularly, the controller 24 causes a seek motor 14 to move an optical pickup 13 so that the light beam collected by the objective lens 34 is focused onto a desired position on the optical disc 2 being rotated by a spindle motor 11, obtains recorded data signals output from a data reproduction portion 20 at the time, and analyzes the obtained recorded data signals. Thereby, data recorded on the optical disc 2 is read out.

On the other hand, if the servo status is not OK (NO at S18), the controller 24 repeats the process from the above step S11 to perform the recovery operation. Further, after the start of the read operation, if the read operation is not OK (i.e., if data recorded on the optical disc 2 cannot be read out normally) (NO at S20), the controller 24 also repeats the process from the above step S11 to perform the recovery operation.

According to the optical disc reader 1 configured as described above, between the completion of the focusing operation and the start of the tracking operation, the determination as to whether or not the light beam is properly focused on the data recording layer is made based on the number of zero crossings in the TE signal before the TE signal conditioning by the TE signal conditioner 17 (i.e., based on the TE signal generated by the signal processor 16). Then, if it is determined that the light beam is not properly focused, the focusing operation is performed again for recovery before the tracking operation is performed. Accordingly, the optical disc reader 1 configured as described above can produce effects similar to those of the first embodiment.

The present invention has been described above using a presently preferred embodiment, but those skilled in the art will appreciate that various modifications are possible. For example, in the above described embodiments, the determination as to whether or not the light beam is properly focused on the data recording layer is made based on the number of zero crossings in the TE signal during one revolution of the optical disc. Instead of this method, the determination may be made based on the number of zero crossings in the TE signal while the optical disc is rotated through a certain angle or while the optical disc is rotated for a certain period of time. Alternatively, the determination may be made based on the amplitude level of the TE signal or the frequency of the TE signal. Further, an optical disc reader according to this invention may comprise separate photodiodes for focusing, tracking, and recorded data reading.

This application is based on Japanese patent application 2009-030300 filed Feb. 12, 2009, the contents of which are hereby incorporated by reference.

What is claimed is:

1. An optical disc reader comprising:
light emission means for emitting a light beam;
light collection means for collecting the light beam emitted from the light emission means and focusing the light beam onto an optical disc;
focusing means for performing a focusing operation to cause the light collection means to focus the light beam on a data recording layer in the optical disc;
tracking error signal generating means for generating a tracking error signal corresponding to a radial offset of a focal point of the light collection means from a data recording track on the optical disc;
tracking means for performing a tracking operation to cause the light collection means to focus the light beam on the data recording track on the optical disc, based on the tracking error signal generated by the tracking error signal generating means; and
a controller that controls a read operation to read data recorded on the optical disc,
wherein, after causing the focusing means to perform the focusing operation, the controller executes a determination process for determining whether or not the light beam is properly focused on the data recording layer based on the tracking error signal generated by the tracking error signal generating means, before causing the tracking means to perform the tracking operation;
wherein, when, as a result of the determination process, the controller determines that the light beam is not properly focused, the controller causes the focusing means to perform the focusing operation again; and
wherein, when, as a result of the determination process, the controller determines that the light beam is properly focused on the data recording layer, the controller causes the tracking means to perform the tracking operation and then starts the read operation.

2. The optical disc reader according to claim 1, further comprising zero crossing counting means for counting number of zero crossings in the tracking error signal generated by the tracking error signal generating means,
wherein, in the determination process, the controller determines whether or not the light beam is properly focused on the data recording layer based on the number of zero crossings in the tracking error signal that is counted by the zero crossing counting means.

3. The optical disc reader according to claim 2, further comprising tracking error signal conditioning means for performing tracking error signal conditioning to amplify the tracking error signal generated by the tracking error signal generating means,
wherein the tracking means performs the tracking operation based on the tracking error signal conditioned by the tracking error signal conditioning means;

wherein the zero crossing counting means counts the number of zero crossings in the tracking error signal conditioned by the tracking error signal conditioning means; and wherein, in the determination process, when the number of zero crossings in the tracking error signal, which is counted by the zero crossing counting means during one revolution of the optical disc, is less than or equal to a threshold value, the controller determines that the light beam is properly focused on the data recording layer, and when the number of zero crossings in the tracking error signal, which is counted by the zero crossing counting means during one revolution of the optical disc, exceeds the threshold value, the controller determines that the light beam is not properly focused.

4. The optical disc reader according to claim 2, further comprising tracking error signal conditioning means for performing tracking error signal conditioning to amplify the tracking error signal generated by the tracking error signal generating means, wherein the tracking means performs the tracking operation based on the tracking error signal conditioned by the tracking error signal conditioning means;

wherein the zero crossing counting means counts the number of zero crossings in the tracking error signal before the tracking error signal conditioning by the tracking error signal conditioning means; and wherein, in the determination process, when the number of zero crossings in the tracking error signal, which is counted by the zero crossing counting means during one revolution of the optical disc, is greater than or equal to a threshold value, the controller determines that the light beam is properly focused on the data recording layer, and when the number of zero crossings in the tracking error signal, which is counted by the zero crossing counting means during one revolution of the optical disc, is less than the threshold value, the controller determines that the light beam is not properly focused.

* * * * *